United States Patent [19]

Watanabe et al.

[11] Patent Number: 4,608,198

[45] Date of Patent: Aug. 26, 1986

[54] FLAME RETARDANT FOR HALOGEN-CONTAINING VINYL RESINS

[75] Inventors: Yoshitane Watanabe, Tokyo; Keitaro Suzuki, Narashino; Susumu Suda, Higashimatsuyama, all of Japan

[73] Assignee: Nissan Chemical Industries, Ltd., Tokyo, Japan

[21] Appl. No.: 647,038

[22] Filed: Sep. 4, 1984

[30] Foreign Application Priority Data

Sep. 10, 1983 [JP] Japan ................................. 58-167335
Sep. 10, 1983 [JP] Japan ................................. 58-167336

[51] Int. Cl.$^4$ ............................................. C09K 21/04
[52] U.S. Cl. ................................. 252/609; 524/410
[58] Field of Search .............. 524/409, 410, 411, 412, 524/416, 417, 433; 260/DIG. 24; 423/617; 252/608, 609

[56] References Cited

U.S. PATENT DOCUMENTS

| | | | |
|---|---|---|---|
| Re. 31,214 | 4/1983 | Petrow | 524/411 |
| 2,508,801 | 5/1950 | Sans | 524/417 |
| 2,597,987 | 5/1952 | Harding | 524/417 |
| 3,718,584 | 2/1973 | Beste et al. | 252/609 |
| 3,897,389 | 7/1975 | Touval | 524/412 |
| 4,110,247 | 8/1978 | Gower et al. | 252/617 |
| 4,345,040 | 8/1982 | Hall | 524/417 |
| 4,362,658 | 12/1982 | Contin | 252/609 |

FOREIGN PATENT DOCUMENTS 2931523  2/1981  Fed. Rep. of Germany .

OTHER PUBLICATIONS

Journal of Coated Fabric, vol. 11, 137–142 (1982).
Lally et al., "Stabilization of Polyvinyl Chloride" Modern Plastics (Dec. 1949) 111, 112, 114, 116, 156 to 162.

*Primary Examiner*—Veronica P. Hoke
*Attorney, Agent, or Firm*—Frishauf, Holtz, Goodman & Woodward

[57] ABSTRACT

Antimony pentoxide-containing flame retardant for halogen-containing vinyl resins which comprises, with respect to 100 parts by weight of $Sb_2O_5$, (A) 3 to 20 parts by weight of an alkali metal in terms of $M_2O$ wherein M represents an alkali metal, (B) 1 to 25 parts by weight of an alkaline earth metal in terms of M'O wherein M' represents an alkaline earth metal, and (C) 0.04 to 3 parts by weight of a compound selected from the group consisting of phosphoric acid, an ammonium salt of phosphoric acid, and an alkali metal salt of phosphoric acid, in terms of $P_2O_5$, as well as a method for preparing the same.

The flame retardant according to this invention does not impair, the transparency, the thermal stability, or the bleeding resistance of the halogen-containing vinyl resins.

12 Claims, No Drawings

FLAME RETARDANT FOR HALOGEN-CONTAINING VINYL RESINS

BACKGROUND OF THE INVENTION

This invention relates to a flame retardant for halogen-containing vinyl resins in which antimony pentoxide is contained as a main component, more specifically to a flame retardant for halogen-containing vinyl resins in which antimony pentoxide ($Sb_2O_5$) is contained as a main component and which does not impair the transparency or the thermal stability of vinyl chloride resins.

The halogen-containing vinyl resin itself has excellent flame retardancy, but a so-called flexible vinyl chloride resin plasticized with a plasticizer such as dioctyl phthalate and a halogen-containing vinyl resin blended with a combustible resin are easily burnt. With regard to flexible vinyl chloride products such as leathers, hood cloths, wire-covering materials, films and sheets which are widely utilized as interior materials for automobiles, electrical and electronic parts, and architectural materials, or rigid vinyl chloride products blended with a reinforcing material against shock, it is especially essential to give flame resistance.

In order to provide these resins with the flame resistance, a variety of flame retardants have been used. Examples of the flame retardants which are used include inorganic materials such as antimony trioxide ($Sb_2O_3$), sodium antimonate, aluminum hydroxide, zirconium oxide, zinc borate and borax as well as organic materials such as tricresyl phosphate, trichloroethyl phosphate and chlorinated paraffins. Further, organic flame retardants containing bromine are also employed in rare cases. These flame retardants mentioned above have some advantages and disadvantages from the viewpoints of flame-resisting effect, transparency, thermal stability, weather resistance, cold resistance, bleed/bloom resistance and the like.

Antimony trioxide displays an extremely great opacifying effect, since it generally has a particle diameter of 0.5 to 10$\mu$ or so, a large refractive index and a small light transmittance. Therefore, the transparency which is the greatest feature of the halogen-containing vinyl resin will be completely lost, if the above-mentioned antimony trioxide is mixed with the resin. Further, when a pigment is added to the vinyl resin containing the antimony trioxide with the intention of coloring, a great deal of the pigment is required because of its opacifying effect, and kinds of obtainable colors are disadvantageously limited. In order to overcome these drawbacks, it has been suggested to excessively lessen the particle diameter of the antimony trioxide (Japanese Patent Publication No. 7170/1971) and to conversely increase the particle diameter by the single crystallization. Both of them contemplate improving the light transmittance. In the case of the former above, the transparency can remarkably be enhanced, but if the pigment is added, the opacifying function will be heightened, the thermal stability also will become poor, and a manufacturing cost will rise. In the case of the latter above, the sufficient transparency cannot be obtained.

Antimony pentoxide is a flame retardant which is applicable to the halogen-containing vinyl resin which does not cause transparency of the resin to be lost (J. Coated Fabric, Vol. 11, 1982, p. 137). This flame retardant is antimony pentoxide tertrahydrate which is prepared by bringing an antimony pentoxide sol (its particle diamerter ranges from 20 to 100 m$\mu$) into a powdery form with the aid of spray drying or the like. As for this antimony pentoxide tetrahydrate, a refractive index is small and primary particles are extremely fine. Therefore, the antimony pentoxide tetrahydrate has a great light transmittance, which fact indicates that the transparency of the resin is very good. This antimony pentoxide, however, has a drawback of worsening the thermal stability of the resin (see Comparative Examples set forth hereinafter). For the purpose of eliminating this drawback, it has been suggested to make use of a Ba-Cd-Zn stabilizer or a tin mercaptide stabilizer (J. Coated Fabric, Vol. 11, 1982, p. 137). However, these stabilizers cannot be practically used, because of the formation of harmful cadmium and the bleed/bloom in the case of the Ba-Cd-Zn stabilizer, and because of a bad weather resistance in the case of the tin mercaptide stabilizer. Sodium antimonate, when having a large particle diameter, is poor in flame-resisting effect, but it has been reported that when ground up to a level of 0.1 to 8$\mu$ and neutralized with an acid, the sodium antimonate exhibits good transparency, flame retardancy and thermal stability (Japanese Patent Publication No. 36863/1972, which corresponds to U.S. Pat. No. 3,897,389). However, it is clear that the sufficient transparency of the resin cannot be obtained in the range of such a primary particle diameter, and that since this neutralization is partially carried out and thus most of the sodium antimonate remains as it is, sufficient flame retardancy cannot be obtained.

Inorganic materials such as aluminum hydroxide, zirconium oxide, zinc borate and borax are poorer in the flame-resisting effect than antimony trioxide and antimony pentoxide, and have the behavior of losing the transparency of the resin like the antimony trioxide. A phosphorous plasticizer such as tricresyl phosphate and a chlorinated paraffin which have no behavior of losing the transparency but which have a plasticizisng action are poorer in the flame-resisting effect than the antimony trioxide, therefore they must be added in greater amounts. As a result, the bleed will tend to occur and the cold resistance will deteriorate. In consequence, the conventional products and techniques are incapable of imparting flame retardancy to the halogen-containing vinyl resin in an economical manner without imparing any transparency which is the greatest feature thereof, and at the same time satisfying physical properties such as the thermal stability.

SUMMARY OF THE INVENTION

An object of this invention is to provide a flame retardant for halogen-containing vinyl resins, which does not impair transparency and which does not worsen thermal stability or cold resistance of the halogen-containing vinyl resins.

The present inventors have intensively conducted researches for the flame retardant free from the above-mentioned drawbacks, and as a result, this invention has now been completed.

That is, the present inventors have widely studied the application of the antimony pentoxide to the halogen-containing vinyl resin in order to overcome the disadvantage that the thermal stability of the vinyl resins is worsened, keeping up the feature that the antimony pentoxide does not impair the transparency of the resin.

In contrast to antimony trioxide, the antimony pentoxide is a fairly strong solid acid and thus has a character of positively bonding to basic or amphoteric substances including Na, Mg, Ca, Sr, Ba, Zn, Cd, Pb and the like. Accordingly, if the antimony pentoxide is directly applied, as a flame retardant, to the plasticized halogen-containing vinyl resin, it will react with a metallic soap stabilizer which is usually used therein, for example, zinc stearate, barium stearate or magnesium stearate, which fact will outstandingly deteriorate its function as a stabilizer. Consequently, the plasticized halogen-containing vinyl resin will be worsened in thermal stability, and it can be presumed that the coloring and the bleed/bloom phenomena will be caused.

On the basis of the above-mentioned facts and presumption, the present inventors have measured the thermal stability by adding in single or in combination hydroxides of various basic metals such as Na, Ca, Mg, Ba, Zn, Al and Sb (III) to an antimony pentoxide colloid and by applying the resulting mixture to the plasticized halogen-containing vinyl resin. As a result, it has been found that the combination of an alkali metal, an alkaline earth metal and the like is effective in thermal stability.

Further, it has been found that the addition of phosphoric acid or its alkali metal salt permits improving flame retardancy and other characteristics obtained (e.g., prevention of initial coloration) of the resulting resin in which the flame retardant is contained, and this invention has thus been completed.

A flame retardant of this invention is characterized by comprising, with respect to 100 parts by weight of $Sb_2O_5$, (A) 3 to 20 parts by weight of an alkali metal in terms of $M_2O$ wherein M represents an alkali metal;

(B) 1 to 25 parts by weight of an alkaline earth metal in terms of $M'O$ wherein $M'$ represents an alkaline earth metal; and (C) 0.4 to 3 parts by weight of a compound selected from the group consisting of phosphoric acid, its ammonium salt and alkali metal salts, in terms of $P_2O_5$.

DESCRIPTION OF THE PREFERRED EMBODIMENT

The antimony pentoxide materials used in this invention are an antimony pentoxide sol having a primary particle diameter of 5 to 100 m$\mu$ and manufactured by a method of oxidizing antimony trioxide (Japanese Patent Publication No. 11848/1982, which corresponds to U.S. Pat. Re. 31,214), a method of dealkalization of an alkali antimonate with an ion exchange resin (U.S. Pat. No. 4,110,247) or other methods, and an antimony pentoxide sol or suspension each having a primary particle diameter of 200 m$\mu$ or less and manufactured by treating sodium antimonate with an acid. These antimony pentoxides are all in the form of tetrahydrate.

Examples of the alkali metals which are components (A) of the flame retardant of this invention include lithium, sodium and potassium, particularly preferably sodium and potassium.

Examples of the alkaline earth metals of components (B) mentioned above include magnesium (Mg), calcium (Ca), strontium (Sr) and barium (Ba).

Examples of the alkali metal salts of phosphoric acid include disodium hydrogenphosphate, sodium dihydrogenphosphate, sodium phosphate, potassium dihydrogenphosphate, dipotassium hydrogenphosphate and potasssium phosphate.

The preferred contents of these components (A), (B) and (C) are, as given above, with respect to 100 parts by weight of $Sb_2O_5$, 3 to 20 parts by weight, 1 to 25 parts by weight and 0.4 to 3 parts by weight in terms of oxides, respectively.

Further, it is preferred that the flame retardant of this invention contains an organic acid component, and the existence of such an organic acid component can remarkably inhibit the initial coloration phenomenon of the halogen-containing vinyl resin in which the flame retardant is added. This would be considered to be attributable to a cooperative function of the organic acid component and phosphoric acid or the phosphate.

By the content of the organic acid component is meant an amount calculated in terms of the organic acid per se corresponding to the salt thereof, and it is desirable that the flame retardant of this invention further contains 2 to 12 parts by weight of the organic acid component, relative to 100 parts by weight of $Sb_2O_5$.

Examples of the preferable organic acids constituting the organic acid component included citric acid, malonic acid, maleic acid, adipic acid, phthalic acid and fumaric acid, and organic monocarboxylic acids having 6 to 24 carbon atoms such as capric acid, stearic acid, lauric acid and oleic acid.

The flame retardant of this invention desirably contains 3 to 25 parts by weight of zinc (Zn) and/or lead (Pb), in terms of ZnO and PbO respectively, relative to 100 parts by weight of $Sb_2O_5$, in addition to the above-mentioned components (A), (B), and (C). The addition of Zn and/or Pb can be carried out, for example, in the forms of $Zn(OH)_2$, $PbO.nH_2O$ and the like.

In a still preferable embodiment of this invention, the above-mentioned organic component and Zn and/or Pb coexist with the components (A), (B) and (C).

In such an embodiment, it is preferred that Zn and/or Pb coexist(s) with the organic acid component in the form of a salt of citric acid, malonic acid, maleic acid, adipic acid, phthalic acid, fumaric acid, and such organic monocarboxylic acids each having 6 to 24 carbon atoms as referred to above.

The organic acid salt may be blended when the aforementioned flame retardant is blended with the vinyl chloride.

The flame retardant of this invention can be prepared, for example, by adding, to the above-mentioned antimony pentoxide sol or suspension, a hydroxide of an alkali metal (e.g., sodium hydroxide or potassium hydroxide), a salt, preferably a soluble salt of an alkaline earth metal (e.g., magnesium chloride, calcium chloride or barium chloride), or a hydroxide of an alkaline earth metal (e.g. magnesium hydroxide, calcium hydroxide or barium hydroxide octahydrate); further adding, to the resulting mixture, one or more compounds selected from the group consisting of phosphoric acid, its ammonium salt and alkali metal salts; mixing them; separating the resulting substance; drying it; and carrying out its grinding.

The addition of the organic acid component is accomplished by adding citric acid, oxalic acid, malonic acid, tartaric acid, maleic acid, adipic acid, phthalic acid, fumaric acid or the monocarboxylic acid, in the form of a free acid or a salt.

The antimony pentoxide used in this invention is a strong cation exchanger (Japanese Patent Publication No. 6695/1970). Therefore, the added alkali metal ion and alkaline earth metal ion are absorbed into the structure of the antimony pentoxide. If, however, an alkali metal hydroxide and a soluble alkaline earth metal salt mentioned above are added to the antimony pentoxide sol or suspension, the cation-exchangeability of the antimony pentoxide can be blocked. Despite the fact, the structure of antimony pentoxide tetrahydrate is maintained even when a mole ratio of $(M_2O+M'O)/Sb_2O_5$ is 0.8 or more and thus the antimony pentoxide has not been changed into sodium antimonate or pottasium antimonate. By adding such an alkali or an alkaline earth metal compound as mentioned above, the antimony pentoxide is subjected to aggregation, resulting in a modified antimony pentoxide slurry. In the case in which a salt is used, an unnecessary anion such as that of chlorine must be removed by the use of an anion exchange resin, because it will cause a deterioration in the thermal stability. The resulting modified antimony pentoxide slurry contains a base in an amount in excess of the ion exchangeability; therefore it has a pH of 8 to 11. To this slurry, phosphoric aid and/or an alkali phosphate is added, and preferably the organic acid is further added thereto so that the pH of the slurry may be within the range of 6 to 9.

The phosphoric acid and/or the alkali phosphate and the like react with the alkaline earth metal in the slurry to produce a basic salt or a normal salt and then form a certain kind of complex together with the antimony pentoxide.

The additions of the alkali and alkaline earth metal compounds, the phosphoric acid and/or alkali phosphate, and the organic acid can be carried out at room temperature to 100° C., and stirring is preferably carried out vigorously as by a high speed impeller mixer.

The thus obtained antimony pentoxide flame retardant slurry may be directly dried by means of a spray dryer, a drum dryer or the like, or may be filtered under suction or centrifugally to form a cake, which is then dried in a kiln, followed by grinding with the aid of a pin-disc mill, a Jet-O-mizer or the like, if desired, to produce the flame retardant powder of this invention.

The thus produced powder has a particle diameter of 0.2 to 10μ, and it is charaterized by being finely pulverized with ease by means of a high-speed mixer (Henschel mixer) or the like even when the particle diameter of powder is more than 10μ.

The flame retardant of this invention was mixed with the halogen-containing vinyl resin, a plasticizer and a stabilizer such as a Ba-Zn series stabilizer, a Sn series stabilizer, a Zn series stabilizer or the like, by means of a high-speed mixer (Henschel mixer), and the resulting mixture was caused to pass through between a pair of rolls at 170° C. in order to manufacture masticated sheets each having a thickness of 0.7 to 0.8 mm.

For a thermal stability test of these sheets, the Geer oven method was employed. A temperature of the oven was adjusted to 175° C., and evaluation of the thermal stability was carried out on the basis of a period of time taken until each specimen was blackened and a degree of initial coloration.

According to the above-mentioned test results, it is definite that the employment of the combination of an alkali metal and an alkaline earth metal provides less initial coloration than would be the case with an alkali metal alone. Relative to 100 parts by weight of $Sb_2O_5$ in the flame retardant, an amount of the alkali metal to be added is, within the range of 3 to 20 parts by weight in terms of a general formula $M_2O$ (M is Na, K or the like), an amount of the alkaline earth metal to be added is, within the range of 1 to 25 parts by weihgt in terms of a general formula $M'O$ (M' is Mg, Ca, Sr, Ba, or the like), o and a ratio of $(M_2O+M'O)/Sb_2O_5$ is preferably within the range of 0.5 to 2.5 in terms of a mole ratio. The ratio less than 0.5 is insufficient to suppress the ion-exchangeability of antimony pentoxide; when it is more than 2.5, the initial coloration will become greater.

The added phosphoric acid and/or alkali phosphate is also effective in the prevention of initial coloration by an action different from that of an organic acid, and an amount of the phosphoric acid and/or the alkali phosphate to be added is preferably within the range of 0.4 to 3 parts by weight in terms of $P_2O_5$, relative to 100 parts by weight of $Sb_2O_5$.

Further, the above-mentioned organic acid is also noticeably effective in the prevention of initial coloration, and an amount of the organic acid to be added is within the range of 2 to 12 parts by weight and a ratio of the organic acid/M'O is preferably within the range of 0.05 to 1.1 in terms of a mole ratio. When this ratio is less than 0.05, the initial coloration cannot be reduced sufficiently; when it is more than 1.1, a drawback such as an increase in an adhesion of the resin to the rolls at the time of molding will be caused, though the initial coloration will be reduced.

The thus obtained flame retardant of this invention is blended with a halogen-containing vinyl resin, a plasticizer such as dioctyl phthalate, a Ba-Zn series stabilizer or the like and an additive such as an epoxidized soybean oil in a known procedure. For example, a halogen-containing vinyl resin, a powdery stabilizer and a flame retardant are mixed; a liquid stabilizer and dioctyl phthalate (DOP) in which an epoxidized soybean oil has already been dissolved are added thereto while stirring is carried out by a high-speed mixer (Henschel mixer); and the mixing is continued till a temperature of 105° to 115° C. is reached. In this case, an amount of the flame retardant is within the range of 0.5 to 10 parts by weight relative to 100 parts by weight of the halogen-containing vinyl resin.

In this invention, the halogen-containing vinyl resins mean a vinyl chloride resin and its copolymers. The copolymers of the vinyl chloride resin include the copolymers with ethylene, propylene, vinylidene chloride, vinyl acetate, vinyl alcohol, acrylic ester, methacrylic ester, styrene, acrylonitrile and the like. Further, the aforesaid copolymers include the graft copolymers of vinyl chloride, for example, graft copolymers with polystyrene vinyl acetate, polyester, polyurethane and polystyrene. In this invention, the copolymers can be defined as polymers including two or more monomers.

The flame retardant of this invention is a flame retardant for halogen-containing vinyl resins which neither impairs the transparency nor worsens the thermal stability and the cold resistance of these resins.

In the following, this invention will be described in detail with reference to examples, but this invention is not to be limited by them. Incidentally, test procedures employed in the examples are as follows, and it should be noted that percent of each component in the Examples and Comparative Examples denotes percent by weight.

Test for flame retardancy: Pressed sheets each having a thickness of 3.0 mm were prepared, and the test for flame retardant properties was carried out in accordance with a vertical test procedure of UL-94 method.

Test for bleeding: The pressed sheets were allowed to stand for 7 days at a temperature of 80° C. and at a humidity of 99%, and a visual observation was made as to whether or not an oozed liquid was present on the surfaces of the pressed sheets each having a thickness of 1.0 mm in order to accomplish the estimation of the bleed.

Initial coloration properties: Color difference were measured regarding reflected lights from the pressed sheets each having a thickness of 1.0 mm, and the coloring properties were represented by YI values (yellow values).

Transparency: With regard to transmitted light through the pressed sheets each having a thickness of 1.0 mm, light transmittances (L values) were measured.

EXAMPLES 1 TO 6 AND COMPARATIVE EXAMPLES 1 AND 2

(a) Preparation of flame retardants (containing no organic acids)

Flame retardants were prepared in the compounding ratios set forth in Table 1 given hereinafter in the following three manners. The used antimony pentoxide sol had been prepared by the ion-exchange method and was composed of 10% of $Sb_2O_5$ and 0.57% of $Na_2O$.

(I) To the antimony pentoxide sol (containing 10% of $Sb_2O_5$) having a particle diameter of 40 to 70 m$\mu$, there were added a 10% aqueous NaOH solution, a 4% aqueous $Ba(OH)_2.8H_2O$ solution and a 10% aqueous $H_3PO_4$ solution in the proportion set forth in Table 1. After approximately 4 hour's stirring at an ambient temperature, the resulting aggregate of the antimony pentoxide was collected by suction filtration, and the obtained wet cake was dried at a temperature of 120° C. and was then ground by a Jet-O-mizer. The ground product had an average particle diameter of 1$\mu$.

(II) To the antimony pentoxide sol (containing 10% of $Sb_2O_5$) having a particle diameter of 20 to 50 m$\mu$, there were added a 10% aqueous NaOH solution, a 10% aqueous $CaCl_2$ solution and a 10% aqueous $H_3PO_4$ solution in the proportion set forth in Table 1. After approximately 2 hours' stirring at an ambient temperature, a predetermined amount of an anion exchange resin was further added thereto in order to remove chlorine ions, and a resin and a slurry were then separated. The resulting aggregate of the antimony pentoxide was collected by suction filtration, and the wet cake obtained was then dried at a temperature of 150° C. and was ground by a pin-disc mill. The ground product had an average particle diameter of 2.5$\mu$.

(III) To the antimony pentoxide sol (containing 10% of $Sb_2O_5$) having a particle diameter of 80 to 100 m$\mu$, there were added a 10% aqueous NaOH solution, a 10% aqueous $MgCl_2$ solution and a 10% aqueous $H_3PO_4$ solution in the proportion set forth in Table 1. After approximately 3 hours' stirring at an ambient temperature, the resulting aggregate of the antimony pentoxide was collected by suction filtration, and the wet cake obtained was dried at a temperature of 140° to 180° C. and was ground by a high-speed mixer. The ground product had an average particle diameter of 5 $\mu$.

TABLE 1

| Blending Amount of flame retardants | | | | | |
|---|---|---|---|---|---|
| | Example (Blending amount; g) | | | | |
| | 1, 2 | 3 | 4 | 5 | 6 |
| Preparative manner | I | I | I | II | III |
| 10% $Sb_2O_5$ Sol | 1700 | 1480 | 1000 | 1000 | 850 |
| 10% aqueous NaOH solution | 98 | 142 | 60 | 10 | — |
| 10% aqueous KOH solution | — | — | — | — | 70 |
| 4% aqueous $Ba(OH)_2.8H_2O$ solution | 1095 | 1602 | 930 | — | — |
| 10% aqueous $CaCl_2$ solution | — | — | — | 352 | — |
| 10% aqueous $MgCl_2$ solution | — | — | — | — | 33 |
| 10% aqueous $H_3PO_4$ solution | 44 | 32 | 10 | 40 | 11 |

(Preparation of flame retardants for comparison)

COMPARATIVE EXAMPLE 1

To 1200 g of an antimony pentoxide sol (containing 10% of $Sb_2O_5$) having a particle diameter of 40 to 70 m$\mu$, there was added 150 g of a 10% aqueous NaOH solution. After approximately 4 hours' stirring at ambient temperatures, the resulting antimony pentoxide slurry was evaporated to dryness at 130° C. and was ground by a pin-disc mill. The resulting powdery product had an average particle diameter of 3.5$\mu$.

COMPARATIVE EXAMPLE 2

To 720 g of an antimony pentoxide sol (containing 10% of $Sb_2O_5$) having a particle diameter of 20 to 50 m$\mu$, there was added 1800 g of a 4% aqueous $Ba(OH)_2.8H_2O$ solution. After 3 hours' stirring at ambient temperatures, the resulting antimony pentoxide slurry was collected by filtration, and the cake obtained was then dried at 150° C. and ground by a pin-disc mill. The resulting powdery product had an average particle diameter of 2.5$\mu$.

Compositions of the prepared flame retardants are set forth in Table 2 given hereinafter.

TABLE 2

| | | Compositions of Products | | | | | | |
|---|---|---|---|---|---|---|---|---|
| | | Example | | | | | Comparative Example | |
| | | 1 & 2 | 3 | 4 | 5 | 6 | 1 | 2 |
| Compositions of products by wt % (parts by wt.) | $Sb_2O_5$ | 74.4(100) | 68.2(100) | 71.2(100) | 78.2(100) | 79.7(100) | 78.8(100) | 59.6(100) |
| | $Na_2O$ | 7.3(9.8) | 9.0(13.2) | 7.4(10.4) | 4.8(6.1) | 4.5(5.7) | 12.1(15.4) | 3.4(5.7) |
| | $K_2O$ | — | — | — | — | 5.4(6.8) | — | — |
| | BaO | 8.7(11.7) | 14.4(21.1) | 12.9(18.1) | — | — | — | 28.9(48.5) |
| | CaO | — | — | — | 8.1(10.4) | — | — | — |
| | MgO | — | — | — | — | 1.3(1.6) | — | — |
| | $P_2O_5$ | 1.4(1.9) | 1.1(1.6) | 0.5(0.7) | 1.3(1.6) | 0.85(1.1) | — | — |
| | $H_2O$ | 8.2(11.0) | 7.3(10.6) | 8.1(11.4) | 7.6(9.7) | 8.7(11.0) | 9.0(11.4) | 8.1(13.6) |
| Composition ratio products | $\frac{M_2O + M'O}{Sb_2O_5}$ (by mole) | 0.76 | 1.14 | 0.92 | 0.92 | 0.66 | 0.80 | 1. |

33

TABLE 2-continued

| | Compositions of Products | | | | | | |
|---|---|---|---|---|---|---|---|
| | Example | | | | | Comparative Example | |
| | 1 & 2 | 3 | 4 | 5 | 6 | 1 | 2 |
| $\dfrac{P_2O_5}{M_2O + M'O}$ (by wt) | 0.09 | 0.045 | 0.025 | 0.10 | 0.076 | — | — |

Note:
The numbers in parentheses indicate the values relative to 100 parts by weight of $Sb_2O_5$ which have been converted from those of percentage by weight.

(b) Evaluation of the flame retardants

Sheets were prepared by the use of 8 kinds of flame retardants obtained on the preceding part (a) as well as antimony pentoxide (a spray dried product of antiomny Pentoxide) in Comparative Example 3 and antimony trioxide in Comparative Example 4 in accordance with the following blending prescription (Table 3), and thermal stability, transparency and flame retardancy were evaluated for the respective sheets.

TABLE 3

| | Example 1 | Examples 2 to 6 and Comparative Examples 1 to 4 |
|---|---|---|
| PVC*[1] (average polymerization degree 1000) | 100 parts by wt. | 100 parts by wt. |
| Dioctyl phthalate | 50 parts by wt. | 50 parts by wt. |
| Ba—Zn stabilizer*[2] | | |
| BP-57AW | — | 0.7 parts by wt. |
| LTL-257 | — | 1.5 parts by wt. |
| Epoxidized soybean oil*[3] | 1.0 parts by wt. | 1.0 parts by wt. |
| flame retardant | 3.0 parts by wt. | 3.0 parts by wt. |
| Zinc organic monocarboxylate | — | 0.3 to 0.8 parts by wt. |

TABLE 3-continued

| | Example 1 | Examples 2 to 6 and Comparative Examples 1 to 4 |
|---|---|---|
| Sn - maleate stabilizer*[4] | | 1.0 part by wt. | wt.: weight
*[1]Manufactured by Nissan Chemical Industries, Ltd.; Nissan Vinyl H (H-1000).
*[2]Manufactured by Nissan Ferro Organic Chemical Co., Ltd.
*[3]Manufactured by Adeka Argas Inc.; ADK CIZER 0-130P.
*[4]Manufactured by Nitto Kasei Co., Ltd.; TVS-N2000E Each of the above-mentioned blends was mixed for 10 minutes by means of a high-speed mixer (Henschel mixer), and when a temperature of 105° to 115° C. was reached, the mixing was stopped. The blend was then quenched to a level of room temperature, and the resulting compound was kneaded at 170° C. for 5 minutes by the use of a pair of rolls in order to prepare a sheet having a thickness of 0.7 to 0.8 mm. Each sheet was subjected to a thermal stability test. Further, tests for transparency, initial coloration, flame retardancy and bleeding were carried out for the above-mentioned sheet and a pressed sheet having a thickness of 1.0 m and 3.0 mm which had been prepared by pressing the several above-mentioned sheets in layers at 180° C. for 6 minutes. Results are set forth in Table 4 given hereinafter.

TABLE 4

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| zinc organic carboxylate | — | zinc caprate | zinc caprate | zinc laurate | zinc stearate | zinc laurate | zinc caprate | zinc laurate | zinc laurate | zinc caprate |
| Amount of added zinc organic carboxylate | — | 0.3 | 0.6 | 0.5 | 0.8 | 0.6 | 0.5 | 0.6 | 0.5 | 0.4 |
| Zinc organic carboxylate/ flame retardant (weight ratio) | — | 0.10 | 0.20 | 0.17 | 0.27 | 0.20 | 0.17 | 0.20 | 0.17 | 0.13 |
| Thermal stability (time for blackening; minute) | 135 | 150 | 150 | 150 | 135 | 150 | 150 | 60 | 45 | 45 |
| Initial coloration (YI value) | 20 | 13 | 12 | 12 | 14 | 12 | 35 | 20 | light orange | 14 |
| Transparency (L value of transmitted light) | 50 | 50 | 40 | 45 | 45 | 45 | 40 | 40 | 35 | 5 |
| Bleeding resistance | good | good | good | good | good | good | good | good | not good | good |
| Flame retardancy; | 12 | 13 | 13 | 14 | 14 | 15 | 14 | 16 | 14 | 20 |

TABLE 4-continued

| | Example | | | | | | Comparative Example | | | |
|---|---|---|---|---|---|---|---|---|---|---|
| | 1 | 2 | 3 | 4 | 5 | 6 | 1 | 2 | 3 | 4 |
| (second) | | | | | | | | | | |

As is apparent from Table 4, the vinyl chloride sheets in which the flame retardants of this invention are included are more excellent in the transparency, thermal stability, initial coloration resitance and flame retardancy than the sheets indicated by Comparative Examples containing the antimony pentoxide flame retardants and the antimony trioxide.

EXAMPLES 7 TO 11 AND COMPARATIVE EXAMPLES 5 TO 8

(a) Preparation of flame retardants (containing organic acids)

EXAMPLE 7

To 720 g of an antimony pentoxide sol (containing 10% of $Sb_2O_5$ and 0.57% of $Na_2O$; pH=2.3) having a particle diameter of 40 to 70 m$\mu$, there were added 15 g of $Zn(OH)_2$ and 16 g of $Ba(OH)_2.8H_2O$, and 2 hours' stirring was then carried out by means of a high speed impeller mixer. Afterward, 3.0 g of maleic acid and 25 g of a 10% aqueous $H_3PO_4$ solution were added thereto and stirring was further accomplished for 2 hours. The resuting slurry had a pH of 8.2. This slurry was then collected by suction filtration, and the resluting wet cake was dried at 170° C. for 3 hours. The dried cake was then ground by means of a pin-disc mill. The thus obtained flame retardant powder had an average particle diameter of 3$\mu$.

EXAMPLE 8

To 600 g of an antimony pentoxide sol (containing 12% of $Sb_2O_5$ and 0.08% of $Na_2O$; pH=2.5) having a particle diameter of 20 to 50 m$\mu$, there were added 3.0 g of NaOH (solid), 24 g of $Zn(OH)_2$ and 13 g of $Ba(OH)_2.8H_2O$, and 3 hours' stirring was then carried out by a high speed impeller mixer. Next, 4.5 g of maleic acid and 10 g of a 10% aqueous $H_3PO_4$ solution were added thereto, the mixture was then heated up to 60° C., and stirring was further conducted for 3 hours. The resulting slurry had a pH of 7.5. This slurry was directly evaporated to dryness at 150° C. over a period of 5 hours, and the resulting solid material was then ground by a mixer and was further pulverized by a Jet-O-mizer. The thus obtained flame retardant had an average particle of diameter of 1$\mu$.

EXAMPLE 9

To 460 g of an antimony pentoxide sol (containing 16% of $Sb_2O_5$ and 0.98% of $Na_2O$; pH=2.3) having a particle diameter of 40 to 70 m$\mu$, there were added 3.0 g of NaOH (solid), 16 g of $Mg(OH)_2$ and 10 g of $Ba(OH)_2.8H_2O$, and 2 hours' stirring was then carried out by a high speed impeller mixer. Afterward, 5.8 g of adipic acid and 13 g of a 10% aqueous $H_3PO_4$ solution were further added thereto, and stirring was further conducted for 3 hours. The resulting slurry had a pH of 8.0. This slurry was then dried by a spray dryer. The thus obtained flame retardant powder had an average particle diameter of 5$\mu$.

EXAMPLE 10

To 600 g of an antimony pentoxide sol (containing 12% of $Sb_2O_5$ and 0.80% of $Na_2O$; pH=2.5) having a particle diameter of 20 to 50 m$\mu$, there were added 2.0 g of NaOH (solid), 5.0 g of a 20% aqueous $CaCl_2$ solution and 100 g of a 20% aqueous $ZnCl_2$ solution, and 1 hour's stirring was then carried out by a high speed impeller mixer. Next, after 1000 g of an anion exchange resin (Amberlite 410; wet type) was added to the slurry for dechlorination, the anion exchange resin was removed by filtration. Further, 5.5 g of maleic acid and 15 g of a 10% aqueous $H_3PO_4$ solution were added thereto, and additional 2 hours' stirring was then carrried out. The resulting slurry had a pH of 6.2. This slurry was evaporated to dryness at 130° C., and the resulting dried material was then ground by a pin-disc mill. The thus obtained flame retardant powder had an average particle diameter of 3$\mu$.

EXAMPLE 11

To 460 g of an antimony pentoxide sol (containing 16% of $Sb_2O_5$ and 1.0% of $Na_2O$; pH=2.3) having a particle diameter of 60 to 80 m$\mu$, there were added 12 g of KOH (solid), 9.0 g of $Ba(OH)_2.8H_2O$ and 20 g of $Zn(OH)_2$, and 2 hours' stirring was then carried out by a high speed impeller mixer. Afterward, 4.2 g of phthalic acid and 17 g of a 10% aqueous $H_3PO_4$ solution were further added thereto, the mixture was then heated up to 80° C., and stirring was further accomplished for 2 hours. The resulting slurry had a pH of 8.8. This slurry was then filtered out by suction filtration, and the resulting wet cake was dried at 160° C. for 4 hours. The dried cake was then roughly ground by a mixer and was further pulverized by a pin-disc mill. The thus obtained flame retardant powder had an average particle diameter of 2$\mu$.

COMPARATIVE EXAMPLE 5

To 600 g of an antimony pentoxide sol (containing 12% of $Sb_2O_5$ and 0.80% of $Na_2O$; pH=2.5) having a particle diameter of 20 to 50 m$\mu$, there were added 4.1 g of NaOH (solid) and 16 g of $Ba(OH)_2.8H_2O$, and 4 hours' stirring was then carried out by a high speed impeller mixer. The resulting slurry had a pH of 8.8. This slurry was then filtered out by suction filtration, and the resulting wet cake was dried at 150° C. for 4 hours. The dried cake was then ground by a pin-disc mill. The thus obtained flame retardant powder had an average particle diameter of 3$\mu$.

COMPARATIVE EXAMPLE 6

To 1000 g of an antimony pentoxide sol (containing 12% of $Sb_2O_5$ and 0.83% of $Na_2O$; pH=2.3) having a particle diameter of 40 to 60 m$\mu$, there was added 15 g of NaOH (solid), and 3 hours' stirring was then carried out by a high speed impeller mixer. Afterward, 3.5 g of maleic acid were further added therto and additional 2 hours' stirring was then accomplished. The resulting slurry had a pH of 8.5. This slurry was then evaporated to dryness at 130° C. and the resulting solid material was then ground by a pin-disc mill. The thus obtained flame retardant powder had an average particle diameter of of $3\mu$.

COMPARATIVE EXAMPLE 7

In 14000 g of water, 600 g of sodium antimonate (a particle diameter was $6\mu$) which had been ground by a centrifugal ball mill was mixed with a high speed impeller and 60 g of a 10% aqueous $H_3PO_4$ solution was added thereto with stirring. Then, the resulting slurry was evaporated to dryness at 150° C. and was ground by a mixer. The thus obtained flame retardant powder had an average particle diameter of $6\mu$.

COMPARATIVE EXAMPLE 8

An antimony pentoxide sol (containing 14% of $Sb_2O_5$ and 0.82% of $Na_2O$; pH=2.5) having a particle diameter of 20 to 50 m$\mu$ was sprayed and dried by a spray dryer. The obtained antimony pentoxide powder had a particle diameter of $5.2\mu$.

Compositions of the flame retardants prepared in the above Examples and Comparative Examples are set forth in Table 5 given below.

TABLE 6

| Blending Prescription I (parts by weight) | | Blending Prescription II (parts by weight) | |
|---|---|---|---|
| PVC*[1] (average polymerization degree 1000) | 100 | PVC*[1] (average polymerization degree 1000) | 100 |
| Dioctyl phthalate | 50 | MBS*[2] (reinforcing agent against shock) | 30 |
| Ba—Zn stabilizer*[3] | | Ba—Zn stabilizer*[3] | |
| BP-57AW | 0.7 | BP-57AW | 0.7 |
| LTL-257 | 1.5 | LTL-257 | 1.5 |
| Epoxidized soybean oil*[4] | 1.0 | Dibutyltin maleate*[5] | 1.0 |
| flame retardant | 3.0 | flame retardant | 3.0 |

*[1] Manufactured by Nissan Chemical Industries , Ltd.; Nissan Vinyl H (H-1000).
*[2] Manufactured by Kanegahuchi Kagaku Co , Ltd.; Kane Ace (B-22).
*[3] Manufactured by Nissan Ferro Organic Chemical Co., Ltd.
*[4] Manufactured by Adeka Argas Inc.; ADK CIZER 0-130P.
*[5] Manufactured by Sankyo Yuki Co., Ltd ; STANN BM.

Each of the above-mentioned blends was mixed for 10 minutes by means of a high-speed mixer (Henschel mixer), and when a temperature of 105° to 115° C. was reached, the mixing was stopped. The blend was then quenched to a level of room temperature, and the result-

TABLE 5

| | | Compositions of Products | | | | | | | | |
|---|---|---|---|---|---|---|---|---|---|---|
| | | Example | | | | | Comparative Example | | | |
| | | 7 | 8 | 9 | 10 | 11 | 5 | 6 | 7 | 8 |
| Compositions of products by wt % (parts by wt.) | $Sb_2O_5$ | 66.1(100) | 59.6(100) | 65.7(100) | 64.8(100) | 60.0(100) | 74.2(100) | 76.8(100) | 63.8(100) | 81.0(100) |
| | $Na_2O$ | 3.8(5.8) | 5.8(9.7) | 6.0(9.1) | 5.6(8.6) | 3.7(6.2) | 8.0(10.8) | 12.2(15.9) | 12.4(19.4) | 4.7(5.8) |
| | $K_2O$ | — | — | — | — | 7.0(11.7) | — | — | — | — |
| | BaO | 7.1(10.1) | 5.2(8.7) | 4.3(6.5) | — | 3.6(6.0) | — | — | — | — |
| | CaO | — | — | — | 4.5(6.9) | — | — | — | — | — |
| | MgO | — | — | 9.8(14.9) | — | — | — | — | — | — |
| | ZnO | 11.2(16.9) | 18.3(30.7) | — | 10.7(16.5) | 13.4(22.3) | — | — | — | — |
| | Maleic acid | 2.8(4.2) | 3.7(6.2) | — | 5.0(7.7) | — | — | 2.2(2.9) | — | — |
| | Adipic acid | — | — | 5.2(7.9) | — | — | — | — | — | — |
| | Phthalic acid | — | — | — | — | 3.4(5.7) | — | — | — | — |
| | $P_2O_5$ | 1.6(2.4) | 0.6(1.0) | 0.8(1.2) | 1.0(1.5) | 1.0(1.7) | — | — | — | — |
| | $H_2O$ | 7.4(10.1) | 6.8(11.4) | 8.2(12.5) | 8.4(13.0) | 7.9(13.2) | 9.8(13.2) | 8.8(11.5) | 23.1(36.2) | 14.3(17.7) |
| Composition ratio of products | $\frac{M_2O + M'O}{Sb_2O_5}$ (by mole) | 0.52 | 0.70 | 1.82 | 0.87 | 0.85 | 0.80 | 0.83 | 1.02 | 0.3 |
| | organic acid/M'O (by mole) | 0.52 | 0.94 | 0.13 | 0.54 | 0.87 | — | — | — | — |
| | $\frac{P_2O_5}{M_2O + M'O}$ (by wt.) | 0.15 | 0.055 | 0.078 | 0.10 | 0.07 | — | — | 0.06 | — |

NOTE:
The numbers in parentheses indicate the values relative to 100 parts by weight of $Sb_2O_5$ which have been converted from those of percentage by weight.
wt.: weight (b) Evaluation of the flame retardants Sheets were prepared by the use of 9 kinds of flame retardants obtained in the preceding part (a) as well as antimont trioxide by way of an additional comparative example (Comparative Example 9) in accordance with the following two blending prescriptions (Table 6), and thermal stability, transparency and flame retardancy were evaluated for the respective sheets.

ing compound was kneaded at 170° C. for 5 minutes by the use of a pair of rolls in order to prepare a sheet having a thickness of 0.7 to 0.8 mm. Each sheet was subjected to a thermal stability test. Further, tests of transparency, initial coloration, flame retardancy, and bleeding were carried out for the above-mentioned sheet and a pressed sheet having thickness of 1.0 mm and 3.0 mm which had been prepared by pressing several of the aforesaid sheets in layers at 180° C. for 6 minutes. Results of the blending prescriptions I and II are set forth in Tables 7 and 8, respectively.

TABLE 7

| | Results of Blending Prescription I | | | | | | | | | |
|---|---|---|---|---|---|---|---|---|---|---|
| | Example | | | | | Comparative Example | | | | |
| | 7 | 8 | 9 | 10 | 11 | 5 | 6 | 7 | 8 | 9 |
| Thermal | 135 | 150 | 150 | 150 | 135 | 150 | 150 | 150 | 60 | 150 |

TABLE 7-continued

| | Results of Blending Prescription I | | | | | | | | |
|---|---|---|---|---|---|---|---|---|---|
| | Example | | | | | Comparative Example | | | |
| | 7 | 8 | 9 | 10 | 11 | 5 | 6 | 7 | 8 | 9 |
| stability (time for blackening; bbbroinute) | | | | | | | | brown | | brown |
| Initial coloration (YI value) reddish orange | 12 | 12 | 13 | 13 | 12 | Light reddish orange | Light reddish orange | 12 | Reddish orange | 14 |
| Transparency (L value of transmitted light; %) | 45 | 48 | 45 | 43 | 40 | 38 | 40 | 35 | 40 | 5 |
| Bleeding resistance | good | good | good | good | good | good | good | good | not good | good |
| Flame retardency (burning time; second) | 15 | 16 | 15 | 16 | 15 | 15 | 15 | 30 | 13 | 15 |

TABLE 8

| | Results of Blending Prescription II | | | | | | | | |
|---|---|---|---|---|---|---|---|---|---|
| | Example | | | | | Comparative Example | | | |
| | 7 | 8 | 9 | 10 | 11 | 5 | 6 | 7 | 8 | 9 |
| Thermal stability (time for blackening; minute) | 90 | 90 | 90 | 90 | 90 | 90 | 90 | 90 | 60 | 90 |
| Initial coloration (YI value) | 20 | 20 | 22 | 22 | 20 | Light reddish orange | Light reddish orange | 20 | Reddish orange | 22 |
| Transparency (L value of transmitted light; %) | 35 | 40 | 35 | 33 | 33 | 30 | 33 | 28 | 30 | 3 |
| Flame retardancy (burning time; second) | 15 | 16 | 15 | 16 | 15 | 15 | 15 | 35 | 15 | 20 |

As is definite from Tables 7 and 8 above, the flame retardants of this invention are superior to those of Comparative Examples. Particularly, in point of the thermal stability, the flame retardants of this invention are much more excellent than the antimony pentoxide. Further, the flame, retardants of this invention are by far better in point of the transparency than antimony trioxide and are more excellent in the flame retardancy than sodium antimonate.

We claim:

1. A dried flame retardant composition in powder form, said powder having a particle size of 0.2 to 10 microns, comprising, relative to 100 parts by weight of $Sb_2O_5$,
    (A) 3 to 20 parts by weight of an alkali metal in terms of $M_2O$ in which M represents an alkali metal atom;
    (B) 1 to 25 parts by weight of an alkaline earth metal in terms of $M'O$ in which $M'$ represents an alkaline earth metal atom; and
    (C) 0.4 to 3 parts be weight of a compound selected from phosphoric acid, an ammonium salt of phosphoric acid and an alkali metal salt of phosphoric acid in terms of $P_2O_5$.

2. The flame retardant according to claim 1, wherein the molar ratio of $(M_2O+M'O)/Sb_2O_5$ is 0.5 to 2.5.

3. The flame retardant according to claim 1, wherein an organic acid or salt thereof is further contained in an amount of 2 to 12 parts by weight relative to 100 parts by weight of $Sb_2O_5$.

4. The flame retardant according to claim 1, wherein at least one of zinc and lead is further contained in an amount of 3 to 35 parts by weight in terms of ZnO and PbO respectively, relative to 100 parts by weight of $Sb_2O_5$.

5. The flame retardant according to claim 3, wherein said organic acid or salt thereof is incorporated in the form of at least one of an alkali metal salt and an alkaline earth metal salt.

6. The flame retardant according to claim 4, wherein at least one of zinc and lead are incorporated in the form of a salt of an organic acid.

7. The flame retardant according to claim 3, wherein said organic acid is selected from the group consisting of citric acid, malonic acid, maleic acid, adipic acid, phthalic acid, fumaric acid and organic monocarboxylic acids having 6 to 24 carbon atoms.

8. The flame retardant according to claim 3, wherein the molar ratio of organic acid/$M'O$ is 0.05 to 1.1.

9. A method for preparing the dried flame retardant composition of claim 1 which comprises the steps of;
    adding (i) an alkali metal hydroxide, and (ii) a water-soluble salt of an alkaline earth metal or an alkaline earth metal hydroxide to an aqueous sol or an aqueous dispersion of $Sb_2O_5$ to provide a composition having a pH of 8 to 11; and then adding phosphoric acid or a salt thereof until a pH of 6 to 9 is reached, to form a precipitate;

separating said precipitate; and drying the separated precipitate followed by pulverization thereof to obtain a dried particulate flame retardant having a particle size of 0.2 to 10 microns.

10. The method according to claim 9, wherein an organic acid or a salt thereof is further added to said aqueous sol or aqueous dispersion of $Sb_2O_5$ in an amount of 2 to 12 parts by weight relative to 100 parts by weight of $Sb_2O_5$.

11. The flame retardant according to claim 8, wherein said organic acid is selected from the group consisting of citric acid, malonic acid, maleic acid, adipic acid, phthalic acid, fumaric acid and organic monocarboxylic acids having 6 to 24 carbon atoms.

12. The method according to claim 10 wherein said organic acid is selected from the group consisting of citric acid, malonic acid, maleic acid, adipic acid, phthalic acid, fumaric acid and organic monocarboxylic acids having 6 to 24 carbon atoms.

* * * * *